(12) United States Patent
Yamawaki (10) Patent No.: US 6,963,433 B2
(45) Date of Patent: Nov. 8, 2005

(54) MULTIBEAM SCANNING OPTICAL DEVICE AND IMAGE FORMING APPARATUS USING THE SAME

(75) Inventor: Takeshi Yamawaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 10/705,911

(22) Filed: Nov. 13, 2003

(65) Prior Publication Data

US 2004/0095625 A1     May 20, 2004

(30) Foreign Application Priority Data

Nov. 14, 2002  (JP) .............................. 2002-330781

(51) Int. Cl.⁷ ................................................ G02F 1/01
(52) U.S. Cl. ...................................... 359/204; 347/239
(58) Field of Search ............................... 359/201, 204, 359/212, 213, 216, 217; 347/225, 233, 239, 347/241

(56) References Cited

U.S. PATENT DOCUMENTS

| | | | |
|---|---|---|---|
| 5,753,907 A | 5/1998 | Nakajima et al. | 250/234 |
| 5,966,232 A | 10/1999 | Kimura et al. | 359/205 |
| 6,046,835 A | 4/2000 | Yamawaki et al. | 359/205 |
| 6,108,115 A | 8/2000 | Kimura et al. | 359/205 |
| 6,469,772 B1 * | 10/2002 | Itabashi | 359/204 |
| 6,507,427 B1 | 1/2003 | Yamawaki | 359/210 |
| 2002/0014582 A1 | 2/2002 | Yamawaki | 250/234 |
| 2003/0085346 A1 | 5/2003 | Yamawaki | 250/234 |

FOREIGN PATENT DOCUMENTS

JP     2942721     6/1999

* cited by examiner

*Primary Examiner*—Euncha P. Cherry
(74) *Attorney, Agent, or Firm*—Fitzpatrick, Cella, Harper & Scinto

(57) ABSTRACT

To provide a multibeam scanning optical device and an image forming apparatus using the same which can attain both of a large adjustment range and high adjustment accuracy using a plurality of adjusting units having sensitivities different from each other. There is provided a multibeam scanning optical device including: a first optical system which transforms a plurality of light beams emitted from a plurality of light source units into divergent light beams or convergent light beams; a second optical system which focuses a plurality of light beams emitted from the first optical system as a linear image in a main scanning direction in the vicinity of a deflection plane of a deflecting unit; the deflecting unit which deflects a plurality of light beams emitted from the second optical system in the main scanning direction; and a third optical system which focuses the plurality of light beams deflected by the deflecting unit on a surface to be scanned at a predetermined scanning lines gap, in which the multibeam scanning optical device further includes a plurality of adjusting units having sensitivities different from each other which change a relative gap in a sub-scanning direction of principal ray of a plurality of light beams incident in the second optical system.

18 Claims, 6 Drawing Sheets

MULTIBEAM SCANNING OPTICAL DEVICE AND IMAGE FORMING APPARATUS USING THE SAME

BACKGROUND OF THE INVENTION

1. Field of the Invention

The present invention relates to a multibeam scanning optical device and an image forming apparatus using the same. In particular, the present invention is preferably applied to an image forming apparatus such as a digital copying machine, a laser beam printer, or a multi-function printer which synthesizes a plurality of light beams emitted from a plurality of light sources to simultaneously scan a plurality of lines in parallel.

2. Related Background Art

Conventionally, as a technique for increasing processing speed of a scanning optical device for a digital copying machine, a laser beam printer, a multi-function printer, or the like, there has been known, for example, a "multibeam scanning optical device" for realizing the increase in processing speed by focusing a plurality of light beams on a surface to be scanned at a predetermined gap in a sub-scanning direction and forming a plurality of scanning lines simultaneously according to scanning by an optical deflector.

Here, as methods of generating a plurality of beams, for example, there are a method of synthesizing a plurality of light beams emitted from a plurality of light sources so as to be emitted in a substantially identical direction using beam synthesizing means and scanning a plurality of lines, and a method of using a monolithic multibeam laser in which a plurality of light emission points are integrated at a very small gap.

In the latter method, a positioning accuracy is high because the light emission points are integrated at the very small gap. Thus, a scanning lines gap is free from deviation due to relative deviation among beams. However, since thermal and electrical interference of the light emission points occurs due to the integration thereof, it is difficult to stabilize a beam quality, and there is limitation in the number of light emission points which can be integrated.

On the other hand, in the former method, a plurality of light beams emitted from a plurality of independent light sources can be synthesized in proximity to each other. Thus, the same effect as integrating the light sources at a very small gap can be obtained. This method is advantageous in that there is no limitation in the number of light sources and increase in processing speed can be realized by making scanning multiple. However, in the multibeam scanning optical device, a gap in a sub-scanning direction of scanning lines for scanning a surface to be scanned has to be fixed in order to realize satisfactory optical scanning. In particular, in a synthesizing optical system, if a light source and a collimator lens relatively deviate in the sub-scanning direction, or if a change in posture such as relative inclination of a plurality of pairs of light sources and collimator lenses in the sub-scanning direction occurs, gaps of a plurality of scanning lines fluctuate, and an image is deteriorated.

Therefore, the synthesizing optical system requires a mechanism (adjusting means) for adjusting a gap of scanning lines to a predetermined scanning lines gap with a sufficient adjustment accuracy in initial adjustment. In addition, the synthesizing optical system also requires a mechanism for maintaining the scanning lines gap in a predetermined range with respect to a change over time of the scanning lines gap due to environmental variation such as mechanical vibration or temperature rise.

Various multibeam scanning optical devices for solving such problems have been conventionally proposed.

Figure 10:
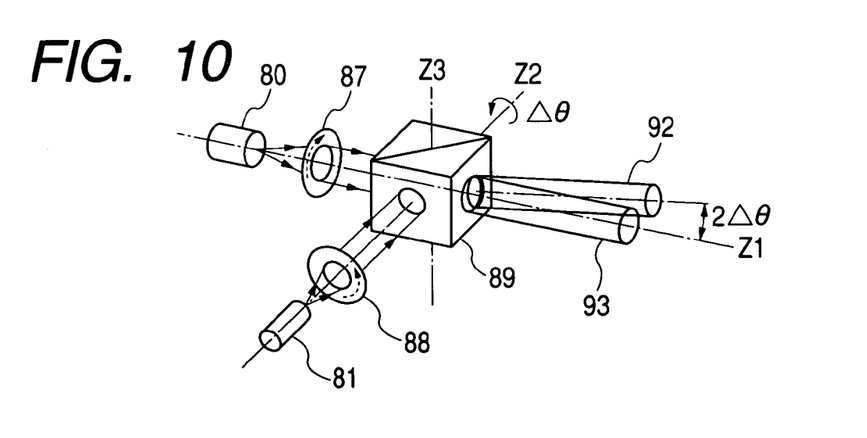
FIG. 10 is a schematic main part diagram of a conventional multibeam scanning optical device.

FIG. 10 shows a conventional multibeam scanning optical device. The multibeam scanning optical device causes two beams from two perpendicular directions to be incident in a beam splitter 89 serving as beam synthesizing means, transmits one beam through all sides of the beam splitter 89, and causes the other beam to reflect on one side. Then, the multibeam scanning optical device rotates the beam splitter 89 around an arbitrary axis to thereby deflect a beam emitted from the beam splitter 89, and provides an angular difference between a reflected beam and a transmitted beam in a sub-scanning section (e.g., see Japanese Utility Model Application Laid-open No. S61-196717).

In other words, in Japanese Utility Model Application Laid-open No. S61-196717, the multibeam scanning optical device makes angles in a sub-scanning direction of two synthesized beams to be incident in cylindrical lenses (not shown) different from each other to thereby cause the synthesized beams to focus on a surface to be scanned apart from each other so as to adjust a scanning lines gap to a predetermined scanning lines gap.

On the other hand, in another multibeam scanning optical device, a plurality of light sources are arranged so as to be substantially parallel to each other. The multibeam scanning optical device transforms light beams emitted from the respective light sources into substantially parallel light beams using corresponding collimator lenses, and generates synthesized beams using a composite prism serving as beam synthesizing means in which a parallel prism and a triangular prism are stuck together (e.g., see Japanese Patent No. 2942721).

In Japanese Patent No. 2942721, the synthesized light beams are set to have a predetermined inter-beam angle on a plane shared by the synthesized light beams. This inter-beam angle provides an angular difference to parallel light beams emitted from the respective collimator lenses by slightly deviating one light source from an optical axis of the collimator lens. The composite prism plays a role of synthesizing means which emits the plurality of beams in proximity to each other.

In addition, the light sources, the collimator lenses, and the composite prism are integrated as an optical unit and are adapted such that synthesized light beams always have a predetermined inter-beam angle on a plane shared by the synthesized light beams. Adjustment of an interline gap is performed by rotating and adjusting the optical unit around an optical axis such that the inter-beam angle has a component within a sub-scanning surface. Since a plurality of beams are incident in the cylindrical lenses at different angles in the sub-scanning direction, the beams are focused in the vicinity of a deflected surface apart from each other in the sub-scanning direction and are focused again on the surface to be scanned at a predetermined focus magnification by a scanning lens, and adjusted to a predetermined scanning lines gap.

In the multibeam scanning optical device of Japanese Patent Laid-open No. 2942721, the plurality of light sources are arranged substantially in parallel with each other, and therefore, the plurality of light sources and collimator lenses are easily held as a common member. It can be said that, compared with the multibeam scanning optical device in Japanese Utility Model Application Laid-open No. S61-196717, the multibeam scanning optical device of Japanese Patent No. 2942721 is resistant to a relative change of posture among light sources due to vibration or environmental variation. In addition, since the plurality of light sources are arranged in parallel with each other, the light sources can be arranged on a common circuit substrate to be driven. Thus, reduction in cost can be expected by decreasing the number of components.

Incidentally, the methods of adjusting a scanning lines gap described in Japanese Utility Model Application Laid-open No. S61-196717 and Japanese Patent No. 2942721 utilize the principle that a plurality of light beams are incident in cylindrical lenses at different angles in a sub-scanning section.

Usually, an angle of a light beam incident in a cylindrical lens in a sub-scanning section has a very high sensitivity with respect to a scanning lines gap. Therefore, in Japanese Patent No. 2942721, the optical unit once generates an angular difference in a main scanning surface, and then the entire optical unit is rotated around an optical axis such that a very fine angle is formed in the sub-scanning surface so as to reduce the sensitivity.

However, if the sensitivity is reduced in order to adjust the scanning lines gap to a predetermined scanning lines gap with a high accuracy, the adjustment range is reduced. In other words, a scanning lines gap error, which occurs in a range of 0.1 mm to 1 mm due to a component error or a low assembly accuracy, cannot be absorbed by the adjustment methods. Therefore, conventionally, for example, a long time is required for highly accurate processing of components and accurate adjustment for assembly in order to suppress a scanning lines gap error which occurs in an assembly process, resulting in an increase in manufacturing cost.

SUMMARY OF THE INVENTION

It is an object of the present invention to provide a multibeam scanning optical device and an image forming apparatus using the same which can attain both of a large adjustment range and high adjustment accuracy using a plurality of adjusting means having sensitivities different from each other.

According to the present invention, there is provided a multibeam scanning optical device including: a first optical system which transforms a plurality of light beams emitted from a plurality of light source means into other states; a second optical system which focuses a plurality of light beams emitted from the first optical system as a linear image in a main scanning direction in the vicinity of a deflection plane of deflecting means; the deflecting means which deflects a plurality of light beams emitted from the second optical system in the main scanning direction; and a third optical system which focuses the plurality of light beams deflected by the deflecting means on a surface to be scanned at a predetermined scanning lines gap, in which the multibeam scanning optical device further includes a plurality of adjusting means having sensitivities different from each other which change a relative gap in a sub-scanning direction of principal ray of a plurality of light beams incident in the second optical system.

DESCRIPTION OF THE PREFERRED EMBODIMENTS

First Embodment

Figure 1A:
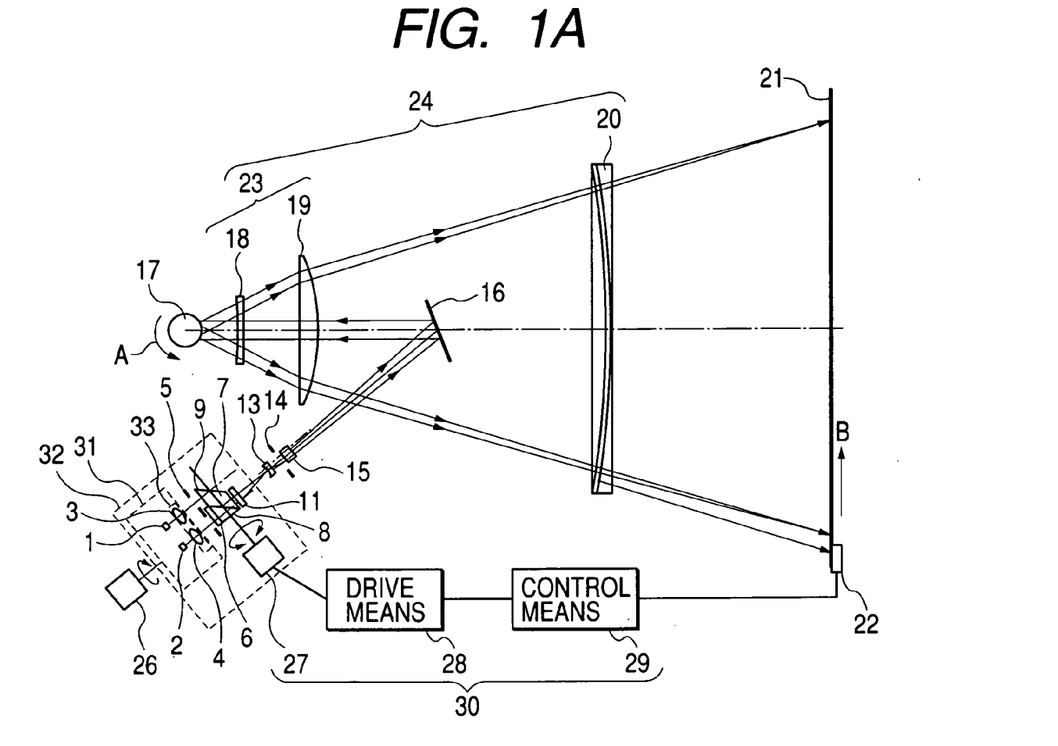
FIG. 1A is a main scanning sectional diagram of a first embodiment of the present invention.
Figure 1B:
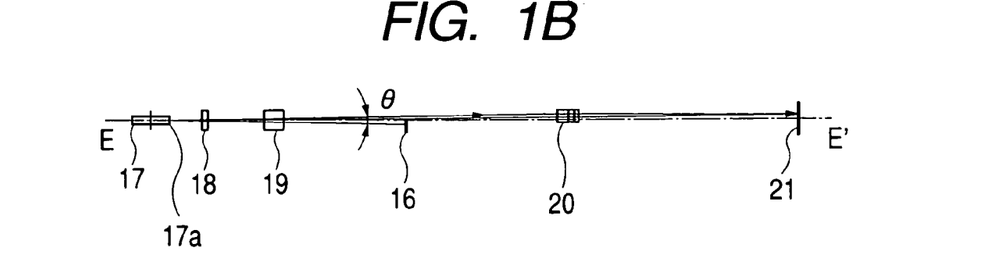
FIG. 1B is a sub-scanning sectional diagram of the first embodiment of the present invention.
Figure 2A:
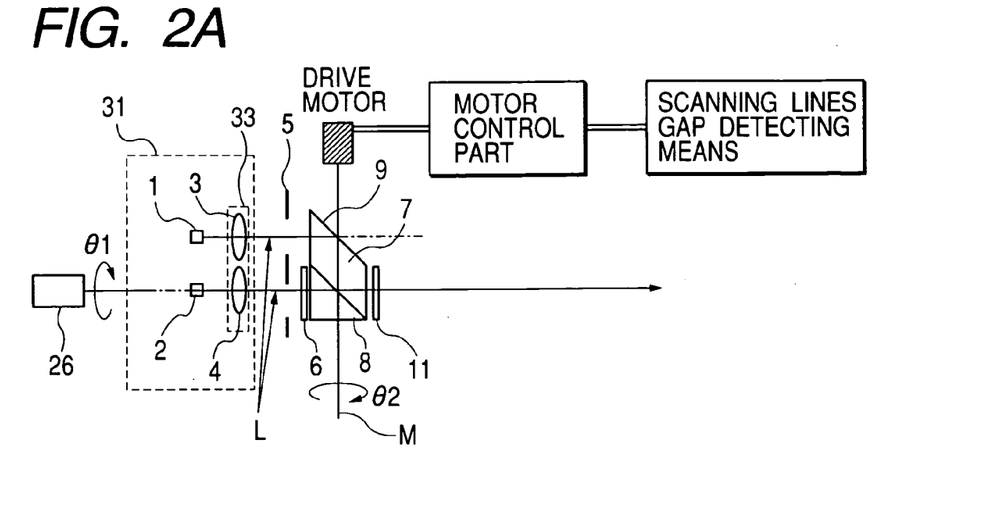
FIG. 2A is a main scanning sectional diagram of an optical unit of the first embodiment of the present invention.
Figure 2B:
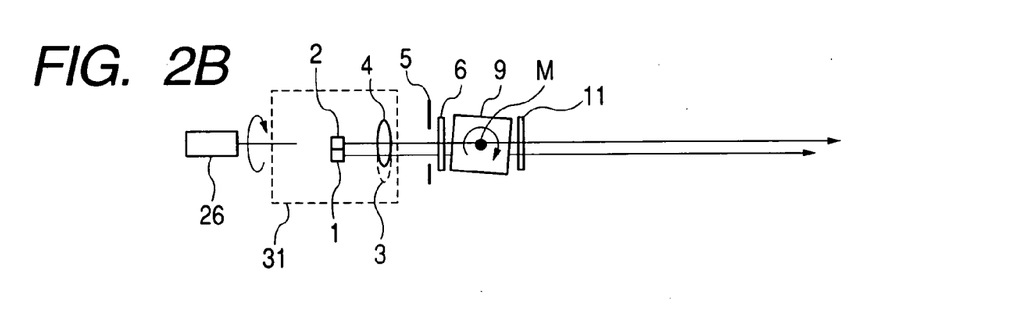
FIG. 2B is a sub-scanning sectional diagram of the optical unit of the first embodiment of the present invention.

FIG. 1A is a main part sectional diagram in a main scanning direction (main scanning sectional diagram) of a first embodiment of the present invention. FIG. 1B is a main part sectional diagram in a sub-scanning direction (sub-scanning sectional diagram) of FIG. 1A. FIG. 2A is a main part sectional diagram in a main scanning direction of an optical unit (multibeam light source unit) shown in FIG. 1A. FIG. 2B is a main part sectional diagram in a sub-scanning direction of FIG. 2A.

Here, the main scanning direction indicates a direction perpendicular to a rotation axis of deflecting means and an optical axis of a scanning optical system (a direction in which a light beam is reflected and deflected (deflected and used for scanning) by the deflecting means). The sub-scanning direction indicates a direction parallel with the rotation axis of the deflecting means. In addition, a main scanning section indicates a plane which is parallel with the main scanning direction and includes an optical axis of scanning optical means. A sub-scanning section indicates a section perpendicular to the main scanning section.

In the figures, reference numeral 31 denotes a light source unit, which includes two light source means, first and second light source means 1 and 2 arranged substantially in parallel with each other and a first optical system 33 having two focusing optical elements (focusing lenses) 3 and 4. In this embodiment, the two light source means, the first and second light source means 1 and 2 and the two focusing lenses 3 and 4 are constituted integrally. Note that three or more light source means and focusing optical elements corresponding thereto may be provided.

The first and second light source means 1 and 2 are composed of a semiconductor laser, respectively, and are arranged so as to emit a linear polarization in a direction substantially perpendicular to a space. With such an arrangement, the semiconductor lasers are capable of emitting a light beam which has a radiation angle wide in the main scanning direction and narrow in the sub-scanning direction.

The two focusing lenses 3 and 4 constituting the first optical system 33 transform light beams emitted from the first and second light source means 1 and 2 corresponding thereto, respectively, into divergent light beams or convergent light beams. In this embodiment, the focusing lenses 3 and 4 are arranged such that optical axes L thereof are parallel or substantially parallel with each other.

Reference numeral 5 denotes an aperture stop, which restricts an incident light beam. In this embodiment, a light beam is prevented from turning into flare or scattered light by the aperture stop 5.

Figure 3:
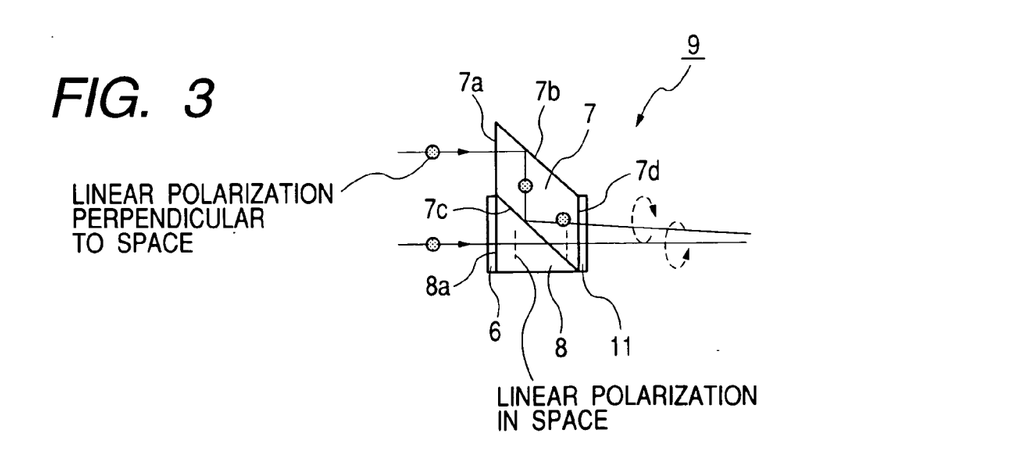
FIG. 3 is a diagram showing a structure of a composite prism of the first embodiment of the present invention.

Reference numeral 6 denotes a half-wave plate, which is arranged on an incident plane 8a of a triangular prism 8 described later. As shown in FIG. 3, the half-wave plate 6 transforms a light beam emitted from the second light source means 2 into a linear polarization in a space (P polarization) in terms of a polarization direction.

Reference numeral 9 denotes a composite prism serving as beam synthesizing means, which synthesizes two light beams emitted from the light source unit 31 into two light beams proximate to each other. The beam synthesizing means 9 in this embodiment is constituted by a composite prism in which a parallel prism 7 and the triangular prism 8 are stuck together. As shown in FIG. 3, on a surface 7c on which the parallel prism 7 and the triangular prism 8 are stuck together, a multilayer film functioning as a polarization beam splitter, which reflects a linear polarization perpendicular to a space (S polarization) and transmits a linear polarization in a space (P polarization), is formed. In this embodiment, an emission plane 7d of the parallel prism 7 and the incident plane 8a of the triangular prism 8 are constituted so as to be substantially parallel with each other.

Reference numerals 26 and 30 denote first and second adjusting means, which have sensitivities different from each other for changing a relative gap in the sub-scanning direction between main beams of two light beams incident in a lens system (cylindrical lens) 15 serving as a second optical system described later. Note that the sensitivity means a ratio of a unit rotation angle and an amount of movement of a beam position in the sub-scanning direction with respect to the unit rotation angle.

The first adjusting means 26 rotates and adjusts the light source unit 31 with an axis parallel with the optical axes L of the focusing lenses 3 and 4 as a rotation axis to thereby change a relative gap in the sub-scanning direction between principal ray of two light beams emitted from the first and second light source means 1 and 2 and initially adjust a scanning lines gap error which occurs due to an assembly error or the like.

The second adjusting means 30 includes a drive motor 27, drive means 28, and control means 29 which constitute a drive mechanism. The second adjusting means 30 automatically controls the composite prism 9 with the drive mechanism according to a signal from scanning lines gap detecting means 22 described later. Then, the second adjusting means 30 rotates and adjusts the composite prism 9 with an axis M parallel with the main scanning direction as a rotation axis such that a predetermined scanning lines gap can be held to thereby automatically correct a scanning lines gap error due to environmental variation. Note that the drive mechanism fixes the composite prism 9 while a surface to be scanned is scanned by two light beams (during image formation on the page basis).

Reference numeral 11 denotes a quarter-wave plate, which is arranged on the emission plane 7d of the parallel prism 7. As shown in FIG. 3, the quarter-wave plate 11 has a function of transforming two polarization beams perpendicular to each other, which are synthesized by the beam synthesizing means 9, into two circular polarizations (a right-handed circular polarization and a left-handed circular polarization) rotating in opposite directions. When a synthesized beam is transformed into a circular polarization, it is possible to reduce a relative difference between a transmittance and a reflectance of an optical component, through which the beam passes after deflection and scanning, and to make amounts of light of two beams reaching an identical image height on a surface to be scanned the same.

Note that each of the light source unit 31, the aperture stop 5, the half-wave plate 6, the beam synthesizing means 9, the quarter-wave plate 11, and the like constitute an element of an optical unit 32.

Reference numeral 13 denotes a concave lens having a negative refractive power, which changes a light beam emitted from the optical unit 32 into a divergent light beam. Reference numeral 14 denotes an aperture stop, which regulates a passing light beam to form a beam shape.

Reference numeral 15 denotes a lens system (cylindrical lens) serving as a second optical system, which has a predetermined refractive power only in the sub-scanning direction. Reference numeral 16 denotes a return mirror, which bends an optical path of a light beam having passed the cylindrical lens 15 to an optical deflector 17 side.

Reference numeral 17 denotes a polygon mirror (optical deflector) as deflecting means, which is rotated at a constant speed in a direction of an arrow A in the figure by drive means (not shown) such as a motor.

Reference numeral 24 denotes scanning optical means (scanning optical system) serving as a third optical system, which includes an fθ lens system 23 having two fθ lenses, first and second fθ lenses and a long cylindrical lens 20 formed of a plastic material. The fθ lens system 23 in this embodiment includes a spherical concave lens 18 serving as the first fθ lens and a cylindrical lens 19 serving as the second fθ lens. The fθ lens system 23 has a refractive power mainly in the main scanning direction to satisfactorily correct fθ characteristics and curvature of field in the main scanning direction over an effective scanning area. The long cylindrical lens 20 has a refractive power mainly in the sub-scanning direction to bring a deflection plane of the polygon mirror 17 and a surface to be scanned into substantially conjugate relation within a sub-scanning section, and prevent an irradiation position on a photosensitive drum surface 21 serving as the surface to be scanned from deviating due to toppling of the deflection plane to cause unevenness of an image pitch. In addition, the long cylindrical lens 20 suppresses curvature of field in the sub-scanning direction on the photosensitive drum surface 21 and also suppresses fluctuation of a spot diameter by keeping a magnification substantially constant.

Reference numeral 21 denotes a photosensitive drum surface serving as a surface to be scanned.

Reference numeral 22 denotes scanning lines gap detecting means, which is provided outside a scanning area in the vicinity of the surface to be scanned 21 and detects a scanning lines gap (gap in the sub-scanning direction of a plurality of light beams which focus on the surface to be scanned). In this embodiment, the second adjusting means 30 rotates the composite prism 9 on the basis of a signal (error signal) from the scanning lines gap detecting means 22 to thereby automatically adjust a scanning lines gap such that a predetermined scanning lines gap is always maintained.

In addition, the scanning lines gap detecting means 22 also functions as synchronous signal detecting means which controls timing for starting scanning on the surface to be scanned 21 for every two light beams. Accordingly, components of the optical unit can be reduced, and reduction in cost in accordance with reduction in the number of components is realized.

In this embodiment, a light beam emitted from the first light source means 1 is transformed into a divergent light beam or a convergent light beam by the focusing lens 3, and restricted by the aperture stop 5 to be incident from an incident plane 7a of the parallel prism 7. Then, the light beam incident from the place of incidence 7a is reflected on a reflection plane 7b and the polarization beam splitter surface 7c to be emitted in a direction substantially parallel with the incident light beam from the emission plane 7d.

On the other hand, the light beam emitted from the second light source means 2 is transformed into a divergent light beam or a convergent light beam by the focusing lens 4, restricted by the aperture stop 5, and transformed into a linear polarization (P polarization) in a space by the half-wave plate 6 to be incident from the incident plane 8a of the triangular prism 8. Then, the light beam incident from the incident plane 8a is transmitted through the polarization beam splitter surface 7c to be emitted from the emission plane 7d of the parallel prism 7.

Then, two polarization beams perpendicular to each other, which are synthesized by the beam synthesizing means 9, are transformed into two circular polarizations rotating in opposite directions by the quarter-wave plate 11, respectively. Then, the circular polarizations are transformed into divergent light beams through the concave lens 13, restricted by the aperture stop 14, transmitted through the cylindrical lens 15, and bent by the return mirror 16 to be incident in the polygon mirror 17 serving as deflecting means from optical axes of the second and first fθ lenses 19 and 18 (substantially the center of an angle of deflection of the polygon mirror) (front incidence).

In addition, as shown in FIG. 1B, the two incident light beams are incident on a deflection plane 17a of the polygon mirror 17 with an angle of θ/2 within the sub-scanning section, and transmitted through the first and second fθ lenses 18 and 19 twice before and after deflection and scanning.

In the main scanning section, the two light beams incident on the deflection plane 17a of the polygon mirror 17 are transmitted through the second and first fθ lenses 19 and 18 to be transformed into substantially parallel light beams and incident on the deflection plane 17a with a larger light beam width. A scanning method, with which the incident light beam width is larger than the deflection plane 17a of the polygon mirror 17 and the deflection plane moves in the incident light beams as described above, is called an over-filled scanning optical system (OFS scanning optical system).

In the overfilled scanning optical system, a deflection plane of the polygon mirror 17 serves as a substantial aperture stop which restricts a light beam width in the main scanning direction to substitute for the aperture stop 14. In other words, since the deflection plane of the polygon mirror 17 coincides with the step, the deflection plane of the polygon mirror 17 acts as an ideal aperture stop with respect to a jitter between two beams coinciding with the aperture stop and a gap difference in the sub-scanning direction of the two beams.

The two light beams, which are reflected by the polygon mirror 17 and deflected and used for scanning, are focused as spots on the surface to be scanned 21 by the first and second fθ lenses 18 and 19 and the long cylindrical lens 20, respectively, and used for scanning at a substantially equal speed. The long cylindrical lens 20 has a function of focusing a beam mainly in the sub-scanning direction, and focuses the incident two beams on the surface to be scanned 21 at a predetermined scanning lines gap.

In this embodiment, as described above, the light source unit 31 is rotated and adjusted by the first adjusting means 26 at an angle of θ1 with an axis parallel with the optical axes L of the focusing lenses 3 and 4 as a rotation axis, whereby a scanning lines gap in the sub-scanning direction between main beams of the two light beams emitted from the first and second light source means 1 and 2 can be changed. As a result, a line gap error, which occurs when the light source unit 31 is assembled, is corrected.

The principle for correction of a line gap utilizes the fact that, when a height of a convergent light beam or a divergent light beam incident in the lens having a refractive power in the sub-scanning direction (the concave lens 13 and the cylindrical lens 15) changes, a height of a focusing position also changes. A sensitivity of adjustment of a line gap depends upon a degree of convergence or divergence and a synthesizing focal length of the lens having refractive power in the sub-scanning direction.

In addition, in this embodiment, as described above, the composite prism 9 is rotated and adjusted by the second adjusting means 30 at an angle of θ2 about the axis M parallel with the main scanning direction, whereby a scanning lines gap in the sub-scanning direction between principal ray of two light beams emitted from the composite prism 9 can be changed by the action of the parallel prism 8. Accordingly, a scanning lines gap error due to environmental variation is automatically corrected.

The rotation of the composite prism 9 can be controlled accurately by a drive mechanism such as a stepping motor. In addition, the second adjusting means 30 can be constituted in a small size compared with the first adjusting means 26. Therefore, the motor is controlled according to a signal from the scanning lines gap detecting means 22, whereby it is made possible to automatically correct the scanning lines gap by controlling.

As described above, in this embodiment, the first and second adjusting means 26 and 30 are provided. Therefore, a scanning lines gap error, which occurs due to an assembly error or the like, is initially adjusted by the first adjusting means 26, and a scanning lines gap error due to environmental variation is automatically corrected by the second adjusting means 30 to make satisfactory image formation possible.

Rough adjustment of a scanning lines gap in the sub-scanning direction is performed by the first adjusting means 26 having the aim of initial adjustment, and fine adjustment of the scanning lines gap in the sub-scanning direction is performed by the second adjusting means 30 having the aim of environmental adjustment. In other words, an amount of adjustment of the scanning lines gap in the sub-scanning direction by the first adjusting means 26 is larger than an amount of adjustment of the scanning lines gap in the sub-scanning direction by the second adjusting means 30.

A ratio of the amount of adjustment of the scanning lines gap in the sub-scanning direction of the second adjusting means 30 and the amount of adjustment of the scanning lines gap in the sub-scanning direction of the first adjusting means 26 is one to ten.

As a guidepost, the amount of adjustment of the scanning lines gap in the sub-scanning direction of the first adjusting means 26 is 1 mm, and the amount of adjustment of the scanning lines gap in the sub-scanning direction of the second adjusting means 30 is 0.1 mm.

In other words, considering the difference of the aims of the first adjusting means 26 and the second adjusting means 30, the amount of adjustment of the scanning lines gap in the sub-scanning direction of the first adjusting means 26 is five times or more as large as the amount of adjustment of the scanning lines gap in the sub-scanning direction of the second adjusting means 30.

In addition, in this embodiment, timing is controlled such that the drive mechanism is not moved during image formation on the page basis, whereby an image quality can be kept constant without a change in image quality at the time of line gap control appearing in one page. In other words, if the composite prism 9 is not rotated and adjusted during the image formation on the page basis, images of the same quality can be formed on the page basis. Therefore, it is possible to prevent images of different qualities from being formed in a page.

In addition, the optical axes L of the focusing lenses 3 and 4 are arranged so as to be in parallel or substantially in parallel with each other, whereby a plurality of light source means and a plurality of focusing lenses are constituted in a small size. Thus, circuit substrates for controlling the light source means can be arranged in parallel with each other, and therefore space-saving can be realized.

In addition, in this embodiment, it is possible to attain an adjusting mechanism, with which sufficient resolution can be obtained for a predetermined line gap, simply by rotating (tilting) the composite prism 9 serving as synthesizing means by an angle θ2. Thus, automatic control for correcting a fine line gap error caused by environmental variation is enabled.

In addition, in this embodiment, even if the entire light source unit 31 functioning for initial adjustment is rotated around an optical axis, a gap in the sub-scanning direction between the light sources can be relatively significantly changed.

In addition, in this embodiment, if a rotation axis is assumed to extend in the main scanning direction, a height of a main beam in the sub-scanning direction can be changed relatively between a beam transmitted through the composite prism 9 and a beam reflected by the composite prism 9. Thus, highly accurate line gap adjustment is enabled.

Further, in this embodiment, by adopting the overfilled scanning optical system, it becomes possible to constitute the polygon mirror 17 with a small diameter polyhedron, and scanning of a higher speed can be performed in proportion to an increase in the number of sides.

Second Embodiment

Figure 4A:
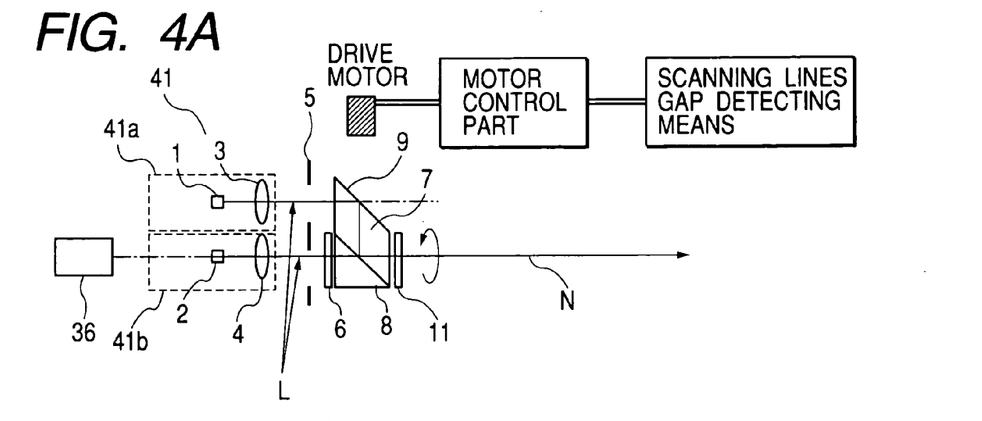
FIG. 4A is a main scanning sectional diagram of an optical unit of a second embodiment of the present invention.
Figure 4B:
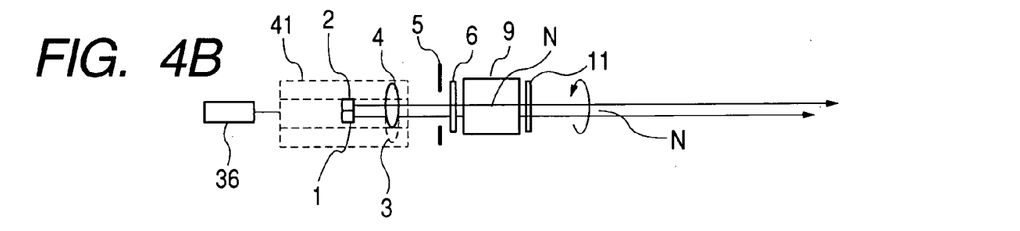
FIG. 4B is a sub-scanning sectional diagram of the optical unit of the second embodiment of the present invention.

FIG. 4A is a main part sectional diagram in a main scanning direction (main scanning sectional diagram) showing an optical unit of a second embodiment of the present invention. FIG. 4B is a main part sectional diagram in a sub-scanning direction (sub-scanning sectional diagram) of FIG. 4A. In FIGS. 4A and 4B, components identical with those shown in FIGS. 1A and 1B are denoted by the same reference symbols.

This embodiment is different from the first embodiment in that a light source unit 41 is divided into first and second units 41a and 41b, a relative gap between the two units 41a and 41b is changed in the sub-scanning direction by the first adjusting means 36, and the correction is performed by rotating the composite prism 9 by the second adjusting means 40 with an axis N parallel with the optical axes L of the focusing lenses 3 and 4 as a rotation axis. Other components and optical actions of this embodiment are substantially the same as those in the first embodiment, whereby the same effects are provided.

In FIGS. 4A and 4B, reference numeral 41 denotes the light source unit, which has the first and second units 41a and 41b. In the first unit 41a, the first light source means 1 and the focusing lens 3 are integrated. In the second unit 41b, the second light source means 2 and the focusing lens 4 are integrated. In addition, the optical axes L of the focusing lenses 3 and 4 of the first and second units 41a and 41b are arranged so as to be parallel or substantially parallel with each other.

In this embodiment, a relative gap between the first and second units 41a and 41b is adjusted by the first adjusting means 36 such that the relative gap is changed in the sub-scanning direction, whereby a scanning lines gap error, which occurs due to an assembly error or the like, is initially adjusted.

As shown in FIG. 4B, the first unit 41a is shifted to the lower side on the figure with respect to the second unit 41b. In this way, the two units, the first and second units 41a and 41b are relatively shifted in the sub-scanning direction, whereby a scanning lines gap error, which occurs at the time when the light source unit 41 is assembled, can be corrected in advance in a stage of initial adjustment. A main factor of a gap error which occurs at the time of assembly is a relative angular difference which occurs when the first and second units 41a and 41b rotate about an axis parallel with the main scanning direction.

On the other hand, a scanning lines gap error, which occurs due to environmental variation such as temperature rise, can be corrected by the second adjusting means 40 such that the composite prism 9 is rotated with the axis N parallel with the optical axes L of the focusing lenses 3 and 4 as a rotation axis. By rotating the composite prism 9 in a direction of an arrow shown in the figure, a light beam from the first light source means 1, which is reflected by the composite prism 9 is emitted from a lower side with respect to a light beam from the second light source means 2, which is transmitted through the composite prism 9. Thus, a sub-scanning gap between main beams of the two beams can be adjusted.

The method of rotating the composite prism 9 about an optical axis in this embodiment does not cause a difference of optical path lengths of transmitted light and reflected light by the rotation of the composite prism 9 compared with the method of rotating the composite prism 9 about an axis parallel with the main scanning direction described in the first embodiment. Thus, there is an advantage that defocus between a plurality of beams does not occur on the surface to be scanned 21.

In this embodiment, if the scanning lines gap detecting means is provided and a mechanism for transmitting an obtained signal to a motor control part to drive the composite prism 9 is provided as in the first embodiment, adjusting means for environmental variation can be automatically constituted as in the first embodiment. Thus, it is possible to keep an image stable with respect to the environmental variation all the time.

As described above, in this embodiment, a relative gap between the first and second units 41a and 41b is changed in the sub-scanning direction by the first adjusting means 36, whereby deviation of a line gap at the time of assembly adjustment can be corrected by initial adjustment. As a result, the method of this embodiment is caused to function as a method enabling a large adjustment range.

In addition, in this embodiment, even if the composite prism 9 constituting the second adjusting means 40 is rotated about an optical axis, the action of adjusting a line gap can also be realized.

Rough adjustment of a scanning lines gap in the sub-scanning direction is performed by the first adjusting means 36 having the aim of initial adjustment, and fine adjustment of the scanning lines gap in the sub-scanning direction is performed by the second adjusting means 40 having the aim of environmental adjustment. In other words, an amount of adjustment of the scanning lines gap in the sub-scanning direction by the first adjusting means 36 is larger than an amount of adjustment of the scanning lines gap in the sub-scanning direction by the second adjusting means 40.

Note that, even if the combinations of the first and second adjusting means described in the first and second embodiments are changed, the first and second adjusting means provide the same actions and effects.

Third Embodiment

Figure 5A:
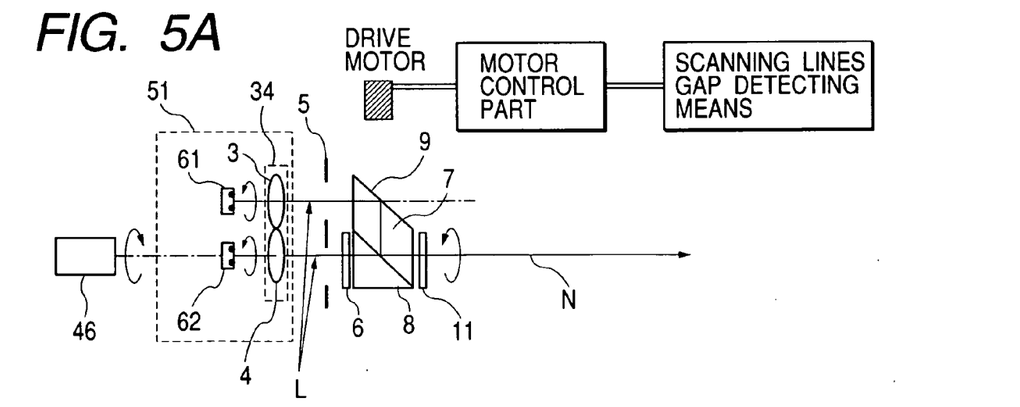
FIG. 5A is a main scanning sectional diagram of an optical unit of a third embodiment of the present invention.
Figure 5B:
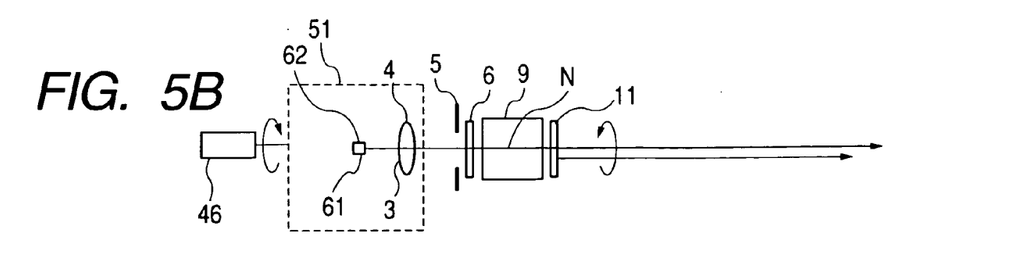
FIG. 5B is a sub-scanning sectional diagram of the optical unit of the third embodiment of the present invention.

FIG. 5A is a main part sectional diagram in a main scanning direction (main scanning sectional diagram) showing an optical unit of a third embodiment of the present invention. FIG. 5B is a main part sectional diagram in a sub-scanning direction (sub-scanning sectional diagram) of FIG. 5A. In FIGS. 5A and 5B, components identical with those shown in FIGS. 1A and 1B are denoted by the same reference symbols.

This embodiment is different from the first embodiment in that a light source unit 51 is constituted by two multibeam laser light sources 61 and 62 having two light emission points on an identical substrate, and the multibeam laser light sources 61 and 62 can be rotated and adjusted by first adjusting means 46 with an axis parallel with the optical axes L of the focusing lenses 3 and 4, which correspond to the multibeam laser light sources 61 and 62, respectively, as a rotation axis. Other components and optical actions of this embodiment are substantially the same as those in the first embodiment, whereby the same effects are provided.

More specifically, in the figures, reference numerals 61 and 62 denote the first and second light source means, respectively. The first and second light source means 61 and 62 are formed of monolithic multibeam laser light sources having two light emission points on an identical substrate. The multibeam laser light sources are rotated and adjusted by the first adjusting means with an axis parallel with the optical axes L of the focusing lenses 3 and 4 as a rotation axis. Thus, a relative gap in the sub-scanning direction between main beams of two light beams emitted from the first and second light source means 1 and 2 is changed, a scanning lines gap error which occurs due to an assembly error or the like is initially adjusted, and a line gap error which occurs when the light source unit 51 is assembled is corrected. Note that the number of light emission points is not limited to two but may be three or more.

A surface emitting type semiconductor laser, which has three or more light emitting parts arranged two-dimensionally, can be applied to the present invention instead of an end face emitting type semiconductor laser.

Moreover, in this embodiment, as in the first embodiment, the entire light source unit 51, in which the first and second light source means 61 and 62 and the first optical system 34 are integrated, is rotated and adjusted by the first adjusting means 46 with an axis parallel with the optical axes L of the focusing lenses 3 and 4 as a rotation axis. Thus, a relative gap in the sub-scanning direction of main beams of two light beams emitted from the first and second light source means 1 and 2 is changed, and a scanning lines gap error which occurs due to an assembly error or the like is initially adjusted. As a result, two beams emitted from the first and second light source means 61 and 62 are focused on a surface to be scanned at a predetermined gap in the sub-scanning direction.

In addition, in this embodiment, as in the second embodiment, the composite prism 9 is rotated about an axis parallel with the optical axes L of the focusing lenses 3 and 4 by the second adjusting means 30, whereby a sub-scanning gap between two beams emitted from the first and second light source means 61 and 62 can be adjusted. As a result, four beams can be adjusted to have an equal gap in the sub-scanning direction on the surface to be scanned 21. In addition, if the composite prism 9 is connected to the scanning lines gap detecting means and the drive mechanism as in the first embodiment, deviation of a scanning lines gap which occurs due to environmental variation or the like can be corrected automatically. Accordingly, a stable image can be maintained.

Note that, although the multibeam laser light sources 61 and 62 and the entire light source unit 51 are rotated and adjusted, respectively, by the first adjusting means 46 in this embodiment, adjustment of at least one component may be sufficient.

As described above, in this embodiment, the multibeam laser light sources are used as light source means, whereby a larger number of beams are used for scanning by a fewer number of synthesizing means to perform scanning lines gap adjustment easily. In addition, the multibeam laser light sources are rotated about an optical axis, whereby a gap of light emission points between multibeams can be relatively changed in the sub-scanning direction to adjust a line gap.

Rough adjustment of a scanning lines gap in the sub-scanning direction is performed by the first adjusting means 46 having the aim of initial adjustment, and fine adjustment of the scanning lines gap in the sub-scanning direction is performed by the second adjusting means 50 having the aim of environmental adjustment. In other words, an amount of adjustment of the scanning lines gap in the sub-scanning direction by the first adjusting means 46 is larger than an amount of adjustment of the scanning lines gap in the sub-scanning direction by the second adjusting means 50.

Note that, in the first to third embodiments, it is desirable to perform control of a scanning lines gap at timing when scanning is stopped between adjacent two pages. This is for securing time in which a composite prism driven by control means stabilizes and for preventing an image quality from changing in the middle of page image formation due to correction of a line gap.

Figure 6:
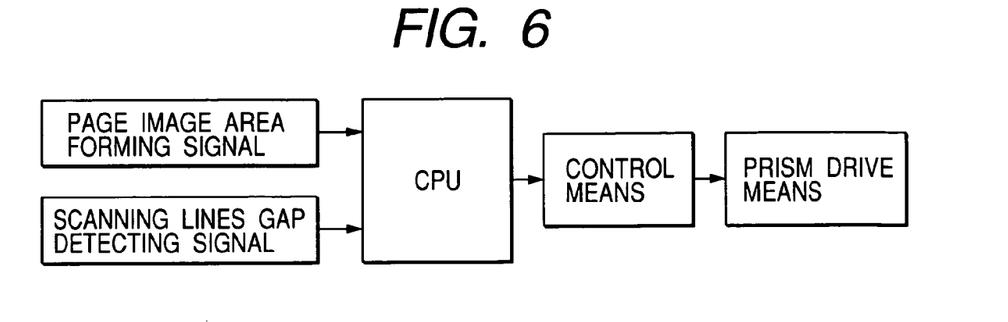
FIG. 6 is a drive control block diagram of a composite prism.

FIG. 6 is a drive control block diagram of the beam synthesizing means 9. In the figure, timing of a page image area forming signal and a scanning lines gap detecting signal is judged by a CPU. When the page image area forming signal is in an OFF state, adjusting means operates prism turning means on the basis of the scanning lines gap detecting signal.

Figure 7:
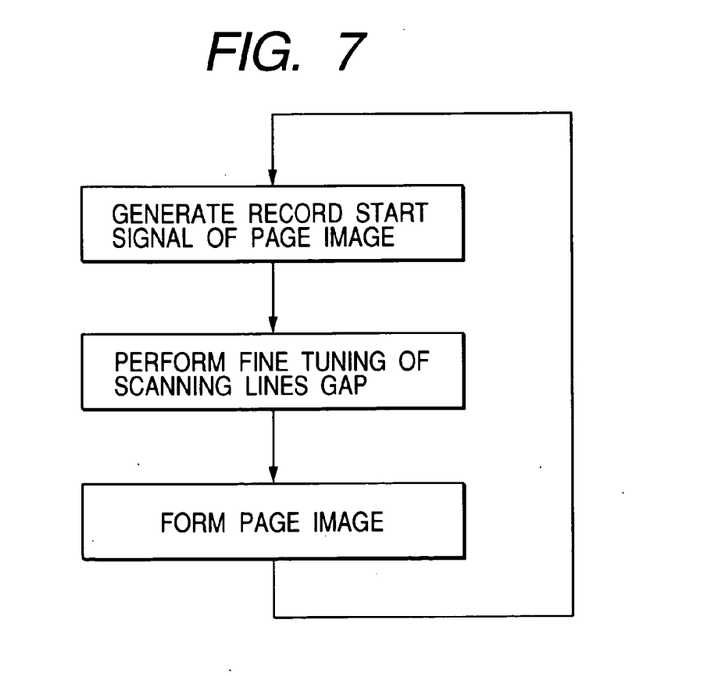
FIG. 7 is a flowchart for correcting a deviation of a scanning lines gap.

FIG. 7 is a flowchart for correcting a deviation of a scanning lines gap. In the figure, when the next record start signal of page image is generated after formation of a page image ends in the figure, fine adjustment of a scanning lines gap is performed on the basis of the above-mentioned drive control block diagram, and a page image is formed. Detection and correction of deviation of a scanning lines gap do not need to be performed every time a page image is formed but may be performed at every fixed time interval.

Although the overfilled scanning optical system (OFS scanning optical system) is used in the first to third embodiments, the present invention is not limited to the overfilled scanning optical system.

The present invention can also be applied to an underfilled scanning optical system which has an incident light beam width narrower than the deflection plane 17a of the polygon mirror 17.

(Image Forming Apparatus)

Figure 8:
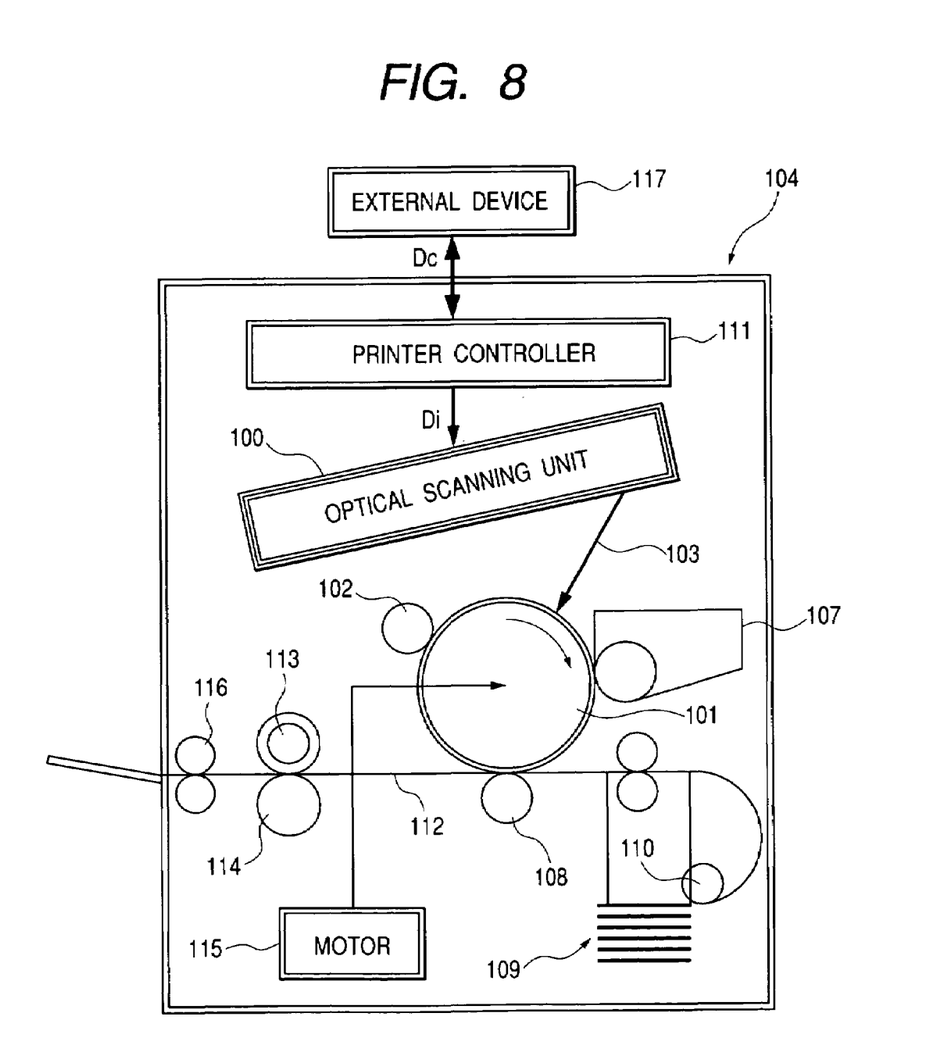
FIG. 8 is a schematic main part diagram of an image forming apparatus of the present invention.

FIG. 8 is a main part sectional diagram in a sub-scanning direction showing an embodiment of an image forming apparatus of the present invention. In the figure, reference numeral 104 denotes an image forming apparatus. Code data Dc is inputted to the image forming apparatus 104 from an external device 117 such as a personal computer. The code data Dc is transformed into image data (dot data) Di by a printer controller 111 in the apparatus. The image data Di is inputted to an optical scanning unit (multibeam scanning optical apparatus) 100 having any one of the structures described in the first to third embodiments. Then, a plurality of light beams 103, which are modulated according to the image data Di, are emitted from the optical scanning unit 100. A photosensitive surface of a photosensitive drum 101 is scanned by the plurality of light beams 103 in a main scanning direction.

The photosensitive drum 101 serving as an electrostatic latent image bearing member (photosensitive member) is rotated clockwise by a motor 115. Then, in accordance with this rotation, the photosensitive surface of the photosensitive drum 101 moves with respect to the plurality of light beams 103 in a sub-scanning direction perpendicular to the main scanning direction. A charging roller 102, which uniformly charges the surface of the photosensitive drum 101, is provided above the photosensitive drum 101 so as to abut against the surface. Further, the plurality of light beams 103, which are used for scanning by the optical scanning unit 100, are irradiated on the surface of the photosensitive drum 101 charged by the charging roller 102.

As described above, the plurality of light beams 103 are modulated on the basis of the image data Di. An electrostatic latent image is formed on the surface of the photosensitive drum 101 by irradiating the plurality of light beams 103 thereon. This electrostatic latent image is developed as a toner image by a developing device 107 which is disposed on a further downstream side in a rotating direction of the photosensitive drum 101 than an irradiation position of the plurality of light beams 103 so as to abut against the photosensitive drum 101.

The toner image developed by the developing device 107 is transferred onto a sheet 112, which serves as a material to be transferred, below the photosensitive drum 101 by a transfer roller 108 disposed so as to be opposed to the photosensitive drum 101. The sheet 112 is received in a sheet cassette 109 in front (on the right side in FIG. 8) of the photosensitive drum 101. However, a sheet can also be supplied by hand. A sheet feed roller 110 is disposed at an end of the sheet cassette 109, and sends the sheet 112 in the sheet cassette 109 into a conveying path.

As described above, the sheet 112 having an unfixed toner image transferred thereon is further conveyed to a fixing device behind the photosensitive drum 101 (on the left side in FIG. 8). The fixing device is constituted by a fixing roller 113 including a fixing heater (not shown) and a pressurizing roller 114 disposed so as to be in press contact with the fixing roller 113. The fixing device heats the sheet 112 conveyed from a transfer part while pressuring the sheet 112 at a press contact part between the fixing roller 113 and the pressurizing roller 114 to thereby fixing the unfixed toner image on the sheet 112. Moreover, a delivery roller 116 is disposed behind the fixing roller 113, and discharges the sheet 112 having the toner image fixed thereon to the outside of the image forming apparatus.

Although not shown in FIG. 8, the print controller 111 performs not only the transformation of data described above but also control of parts in the image forming apparatus such as the motor 115, a polygon motor in an optical scanning unit described later, and the like.

(Color Image Forming Apparatus)

Figure 9:
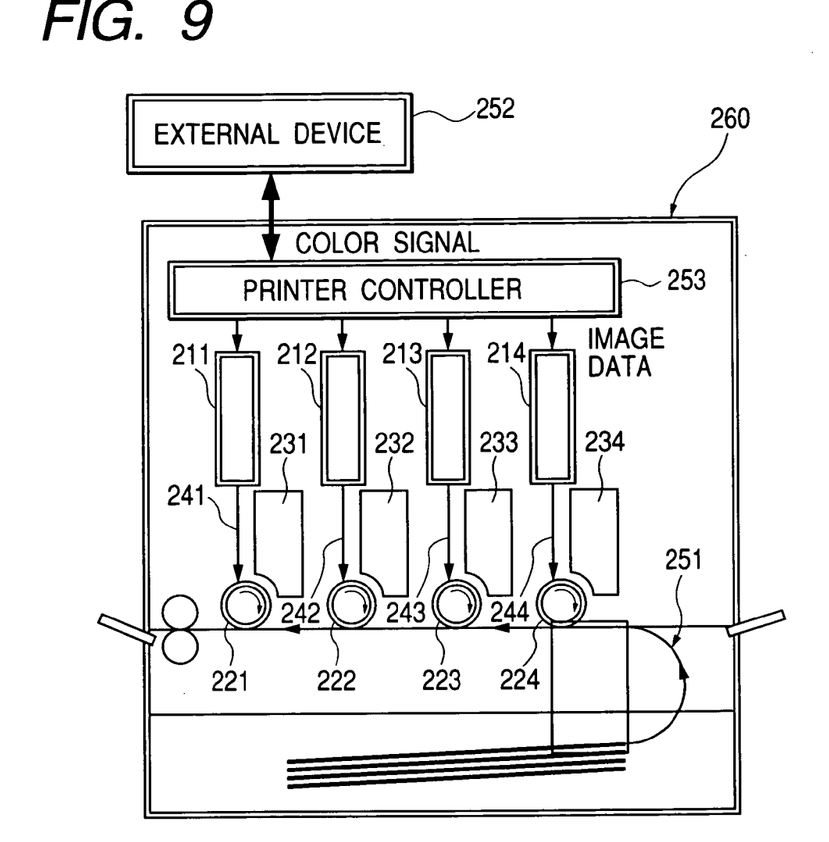
FIG. 9 is a schematic main part diagram of a color image forming apparatus of the present invention.

FIG. 9 is a main part schematic diagram of a color image forming apparatus of the present invention. This embodiment relates to a color image forming apparatus of a tandem type having four optical scanning devices (multibeam scanning optical devices) arranged therein which record image information on a surface of a photosensitive drum serving as an image bearing member in parallel with each other. In FIG. 9, reference numeral 260 denotes a color image forming apparatus; 211, 212, 213, and 214, optical scanning devices having any one of structures described in the first to third embodiments; 221, 222, 223, and 224, photosensitive drums serving as image bearing members; 231, 232, 233, and 234, developing devices; and 51, a conveyor belt.

In FIG. 9, color signals of R (red), G (green), and B (blue) are inputted to the color image forming apparatus 260 from an external device 252 such as a personal computer. These color signals are transformed into image data (dot data) of C (cyan), M (magenta), Y (yellow), and B (black) by a printer controller 253 in the apparatus. These image data are inputted to the optical scanning devices 211, 212, 213, and 214, respectively. Then, light beams 241, 242, 243, and 244, which are modulated according to the respective image data, are emitted from these optical scanning devices. Photosensitive surfaces of the photosensitive drums 221, 222, 223, and 224 are scanned by these light beams in the main scanning direction.

The color image forming apparatus in the present invention has the four optical scanning devices (211, 212, 213, and 214) arranged therein, which correspond to the colors C (cyan), M (magenta), Y (yellow), and B (black), respectively, record image signals (image information) on the photosensitive drums 221, 222, 223, and 224 in parallel with each other, and print a color image at high speed.

As described above, in the color image forming apparatus in the present invention, latent images of the respective colors are formed on the corresponding photosensitive drums 221, 222, 223, and 224 by the four optical scanning devices 211, 212, 213, and 214 using light beams based upon respective image data. Thereafter, the latent images are multiply transferred onto a recording material to form one full color image.

As the external device 252, for example, a color image reading apparatus provided with a CCD sensor may be used. In this case, this color image reading apparatus and the color image forming apparatus 260 constitute a color digital copying machine.

Various examples and embodiments of the present invention have been described. Those skilled in the art would appreciate that the spirit and the scope of the present invention are not limited to the specific descriptions and figures of this specification but cover various alterations and modifications set forth in claims.

The present invention can realize a multibeam scanning optical device which is, as described above, provided with a plurality of adjusting means having different sensitivities from each other, which change a relative gap in a sub-scanning direction of main beams of a plurality of light beams incident in a second optical system, to thereby initially adjust a scanning lines gap error which occurs due to an assembly error or the like, automatically correct a scanning lines gap error due to environmental variation, and make it possible to perform satisfactory image formation, and an image forming apparatus using the multibeam scanning optical device.

What is claimed is:

1. A multibeam scanning optical device comprising:
    a first optical system which transforms a plurality of light beams emitted from a plurality of light source means into divergent light beams or convergent light beams;
    a second optical system which focuses a plurality of light beams emitted from the first optical system as a linear image in a main scanning direction in the vicinity of a deflection plane of deflecting means;
    the deflecting means which deflects a plurality of light beams emitted from the second optical system in the main scanning direction; and
    a third optical system which focuses the plurality of light beams deflected by the deflecting means on a surface to be scanned,
    wherein the multibeam scanning optical device further comprises a plurality of adjusting means having sensitivities different from each other which change a relative gap in a sub-scanning direction of principal ray of a plurality of light beams incident in the second optical system.

2. A multibeam scanning optical device according to claim 1, wherein one of the plurality of adjusting means is automatically controlled by a drive mechanism according to a signal from scanning lines gap detecting means and maintains the predetermined scanning lines gap.

3. A multibeam scanning optical device according to claim 2, wherein the drive mechanism is fixed during image formation on a page basis.

4. A multibeam scanning optical device according to claim 1, wherein the first optical system has a plurality of focusing optical elements and has beam synthesizing means which synthesizes a plurality of light beams emitted from the plurality of focusing optical elements into a plurality of light beams proximate to each other.

5. A multibeam scanning optical device according to claim 4, wherein optical axes of the plurality of focusing optical elements are arranged so as to be parallel or substantially parallel with each other.

6. A multibeam scanning optical device according to claim 1, wherein the plurality of adjusting means include two adjusting means of a first adjusting means and a second adjusting means.

7. A multibeam scanning optical device according to claim 6, wherein the plurality of light source means and the first optical system are integrally formed as a unit, and the first adjusting means includes a mechanism for rotating and adjusting the integrated unit with an axis parallel with the optical axes of the plurality of focusing optical elements as a rotation axis.

8. A multibeam scanning optical device according to claim 6, wherein the plurality of focusing optical elements and the plurality of light source means corresponding thereto are integrated as a unit, respectively, and the first adjusting means includes a mechanism for changing a relative gap among the integrated respective units in the sub-scanning direction.

9. A multibeam scanning optical device according to claim 6, wherein the second adjusting means is automatically controlled.

10. A multibeam scanning optical device according to claim 9, wherein the second adjusting means includes a mechanism for rotating and adjusting the beam synthesizing means with an axis parallel with the main scanning direction as a rotation axis.

11. A multibeam scanning optical device according to claim 9, wherein the second adjusting means includes a mechanism for rotating and adjusting the beam synthesizing means with an axis parallel with the optical axes of the focusing optical elements as a rotation axis.

12. A multibeam scanning optical device according to claim 1, wherein the light source means comprise multibeam laser light sources having a plurality of light emission points.

13. A multibeam scanning optical device according to claim 12, wherein the first optical system includes a plurality of focusing optical elements, and the plurality of adjusting means includes a first adjusting means which rotates and adjusts the multibeam laser light sources corresponding to the focusing optical elements with optical axes of the focusing optical elements as rotation axes.

14. A multibeam scanning optical device according to any one of claims 1 to 13, wherein the deflecting means is constituted by a polygon mirror, and a width in the main scanning direction of a light beam incident in the polygon mirror is larger than a width of a deflection plane of the polygon mirror.

15. An image forming apparatus comprising:
    a multibeam scanning optical device according to any one of claims 1 to 13;
    a photosensitive member arranged on a surface to be scanned;
    a developing device which develops an electrostatic latent image, which is formed on the photosensitive member by a light beam used for scanning by the multibeam scanning optical device, as a toner image;
    a transfer device which transfers the developed toner image onto a material to be transferred; and
    a fixing device which fixes the transferred toner image on the material to be transferred.

16. An image forming apparatus comprising:
    a multibeam scanning optical device according to any one of claims 1 to 13; and
    a printer controller which converts code data inputted from an external device into an image signal and inputs the image signal to the scanning optical system.

17. A color image forming apparatus comprising a plurality of image bearing members which are arranged on a surface to be scanned of a multibeam scanning optical device according to any one of claims 1 to 13, respectively, and form images of colors different from each other.

18. A color image forming apparatus according to claim 17, further comprising a printer controller which converts color signals inputted from an external device into image data of different colors and inputs the image data to the respective scanning optical systems.

* * * * *